April 26, 1938. E. DODSON 2,115,485
CONTROLLING VARIABLE PITCH PROPELLER
Filed Dec. 5, 1936 3 Sheets-Sheet 1

April 26, 1938.  E. DODSON  2,115,485
CONTROLLING VARIABLE PITCH PROPELLER
Filed Dec. 5, 1936  3 Sheets-Sheet 3

Patented Apr. 26, 1938

2,115,485

UNITED STATES PATENT OFFICE 2,115,485

CONTROLLING VARIABLE PITCH PROPELLER

Edward Dodson, Streatham, London, England

Application December 5, 1936, Serial No. 114,465
In Great Britain December 10, 1935

6 Claims. (Cl. 170—135.6)

This invention relates to means for controlling variable pitch propellers. It has been proposed to provide such propellers with means for varying the pitch in a number of ways, such as, for instance, automatically in accordance with engine load or in two or more stages.

The present invention relates to the controlling of such variable pitch propellers used on supercharged or other high compression ratio internal combustion aircraft engines (hereinafter referred to as "supercharged aircraft engines") and it has for its object to provide a control for the means for varying the pitch of the propeller in accordance with the amount of fuel supplied to the engine where the fuel supply is varied by varying the supercharging pressure or the mixture strength, or both. In addition the control of said pitch changing means may be varied in accordance with changes in air density.

According to this invention, a pilot's throttle control is interconnected to an induction throttle valve and a boost control is arranged to vary the position of said throttle valve relatively to the throttle control according to the altitude, while means is provided for varying the fuel supplied to the engine according to the position of the throttle control in combination with means for changing the pitch of the propeller, which pitch changing means is also connected to said means for varying the fuel supplied.

As previously stated, various types of variable pitch propellers are known and the present invention is not restricted to controlling any particular type but, in order to make the invention clear, it will be hereinafter described with reference to two types of variable pitch propellers, reference being made to the accompanying drawings which illustrate the method of controlling the pitch varying means according to this invention, and in which:—

Figure 4 is a diagram showing the pilot's throttle control and the mixture control and showing the means whereby the throttle control operates the mixture control; the arrangement of the controls shown in this figure being applicable to the construction shown in Figures 1, 2 and 3.

Figure 1:
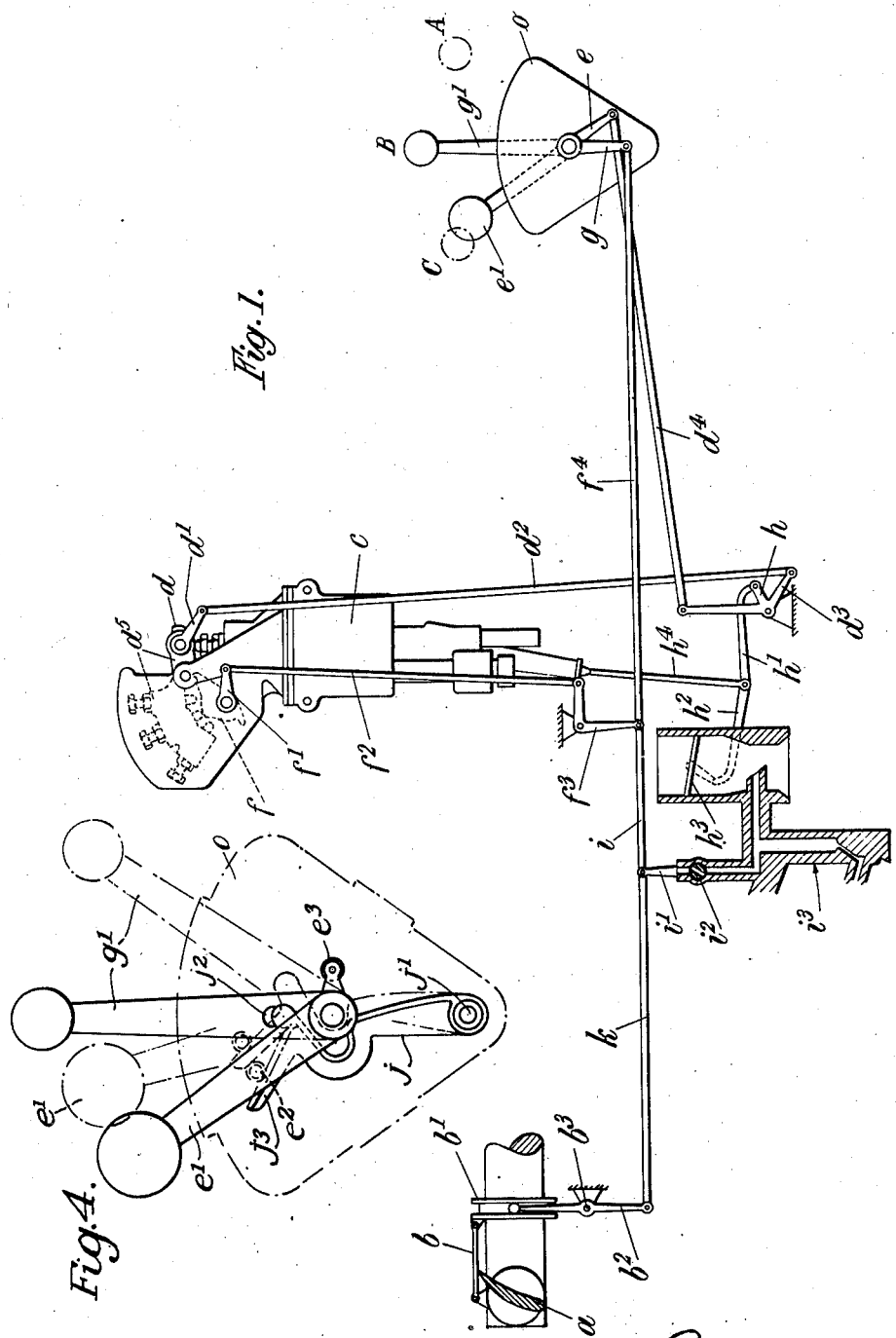
Figure 1 illustrates diagrammatically controlling means for changing the pitch in three stages in accordance with the strength of the mixture supplied to the engine.

In the construction shown in Figure 1 the blade $a$ of the propeller is adapted to be moved into one of three positions by known mechanism indicated diagrammatically in the figure by the link $b$, the sliding sleeve $b^1$ and the lever $b^2$ fulcrumed at $b^3$. As part of the controlling means use is made of the arrangement described in my United States Patent No. 1,995,800 in which a boost control $c$ is provided with means—comprising the cam $d$, arm $d^1$, link $d^2$, bell-crank lever $d^3$, and link $d^4$ connected to an arm $e$ on a throttle control $e^1$— for changing the datum of the boost control by the throttle control $e^1$. According to this invention, however, the boost control also has means comprising the rocker $d^5$, cam $f$, arm $f^1$, link $f^2$, bell-crank lever $f^3$ and link $f^4$ connected to an arm $g$ on a mixture control $g^1$ for changing the datum by the mixture control lever in addition to the change effected by the throttle control $e^1$. The bell-crank lever $d^3$ is provided with an arm $h$ by which it is connected to toggle links $h^1$, $h^2$ for operating the carburettor throttle valve $h^3$. The toggle links $h^1$, $h^2$ are interconnected with the boost control $c$ in a known manner through the link $h^4$. Further, the bell-crank lever $f^3$ is connected by a link $i$ to an arm $i^1$ of a mixture control valve $i^2$ controlling the admission of supplementary air to the carburettor $i^3$. The valve $i^2$ varies the proportion by weight of fuel to air supplied by the carburettor and thus controls the amount of fuel supplied to the engine.

The mixture control $g^1$ is arranged to be set at any one of three different positions marked A, B and C, one giving the ordinary mixture strength for ordinary boost conditions, the second giving an extra rich mixture for take-off or emergency boost conditions and the third an ultra weak mixture for cruising conditions with a reduced output. The mixture control, therefore, determines according to its setting at positions A, B and C the proportion by weight of fuel to air supplied by the carburettor and also the boost pressure.

The mixture control $g^1$ carries an actuating lever $j$, (Figure 4) pivoted at $j^1$, while the pilot's throttle control $e^1$ carries two stops $e^2$, $e^3$ adapted to engage with the actuating lever $j$ in such a manner that the control $e^1$ cannot be moved into certain predetermined positions without moving the mixture control into a corresponding position as described in my prior United States Patent No. 1,998,362.

Thus the mixture control $g^1$ with its interconnections to the means for changing the datum of the boost control and the mixture control valve $i^2$ constitutes means operable by the pilot's throttle control $e^1$ through the lever $j$ and stops $e^2$, $e^3$ for varying the fuel supplied to the engine according to the position of said throttle control $e^1$. A connection is therefore provided between the pitch changing means and said interconnections of the mixture control, this connection consisting of a link $k$ between the link $i$ and the lever $b^2$. Thus, when the mixture control is in the first of the said positions for giving ordinary mixture strength for normal boost conditions then the boost control will restrain the engine to a normal boost pressure and the interconnection with the pitch changing means will be operated to move the pitch of the blades to one of the three stages at which it is predetermined that normal revolutions will be obtained at the particular boost pressure and mixture strength which will then be obtained. If, however, the mixture lever is set in the second position to give an extra rich mixture for take-off and emergency boost conditions, then the interconnection $k$ will decrease the pitch of the propeller and allow the pitch to attain its normal revolutions under these changed conditions. Further, if the mixture lever is moved into its third position so as to give an ultra weak mixture for cruising conditions with a reduced output, then the propeller pitch will be again altered to another stage to allow the engine to maintain the desired revolutions at the lower power available in these conditions.

In the positions of the controls shown in Fig. 1 the throttle control $e^1$ is in its closed position and the mixture control is in the extra rich mixture position. One movement of the throttle control to the right in Fig. 1 the mechanism connected with this control acts, as described in my Patent No. 1,995,800 progressively to increase the opening of the throttle valve $h^3$. In this movement, however, beyond a predetermined position, the stop $e^3$, Fig. 4 on the throttle control $e^1$ will actuate, through the lever $j$, the mixture control $g^1$ moving this from position B to position C. This mixture control $g^1$ will then act through arm $g$, link $f^4$, lever $f^3$, link $f^2$ and the cam $f$ and rocker $d^5$ to depress the cam $d$ and thereby impose an additional movement or boost control to that imposed by the mechanism connected with the throttle control. At the same time this mixture control acts through the links $f^4$ and $i$ to close the valve $i^2$ and thus enrich the mixture, while it also acts through the further link $k$ to change the pitch of the propeller. If now we assume that the mixture and throttle control $g^1$, $e^1$ are both at position A, on moving the control $e^1$ back through position B to position C this control will act through the mechanism connecting it to cam $d$ as described in my Patent No. 1,995,800 to change the datum of the boost control. In this movement of the control $e^1$, however, the stop $e^2$ will actuate the lever $j$ to move the mixture control $g^1$ from position A to position B. In this movement the mixture control will operate through the mixture control mechanism, comprising link $f^4$, lever $f^3$, link $f^2$ the cam $f$ which in turn permits the rocker $d^5$ to rock in such a manner as to depress the cam $d$ bodily and thus impose a further variation in the datum of the boost control. In this movement also the mixture control mechanism will act through the link $i$ to move the valve $i^2$ and through the links $i$ and $k$ to change the pitch of the propeller. It will also be understood that although movement of the throttle control imposes movement on mixture control as explained, yet the mixture control is independently manually movable into any one of the positions marked A, B and C and in such independent movement it imposes the adjustment on the datum of the boost control, and on the valve $i^2$ and on the pitch changing means, in the same way as explained above in cases where the mixture control is moved by the throttle control.

Figure 2:
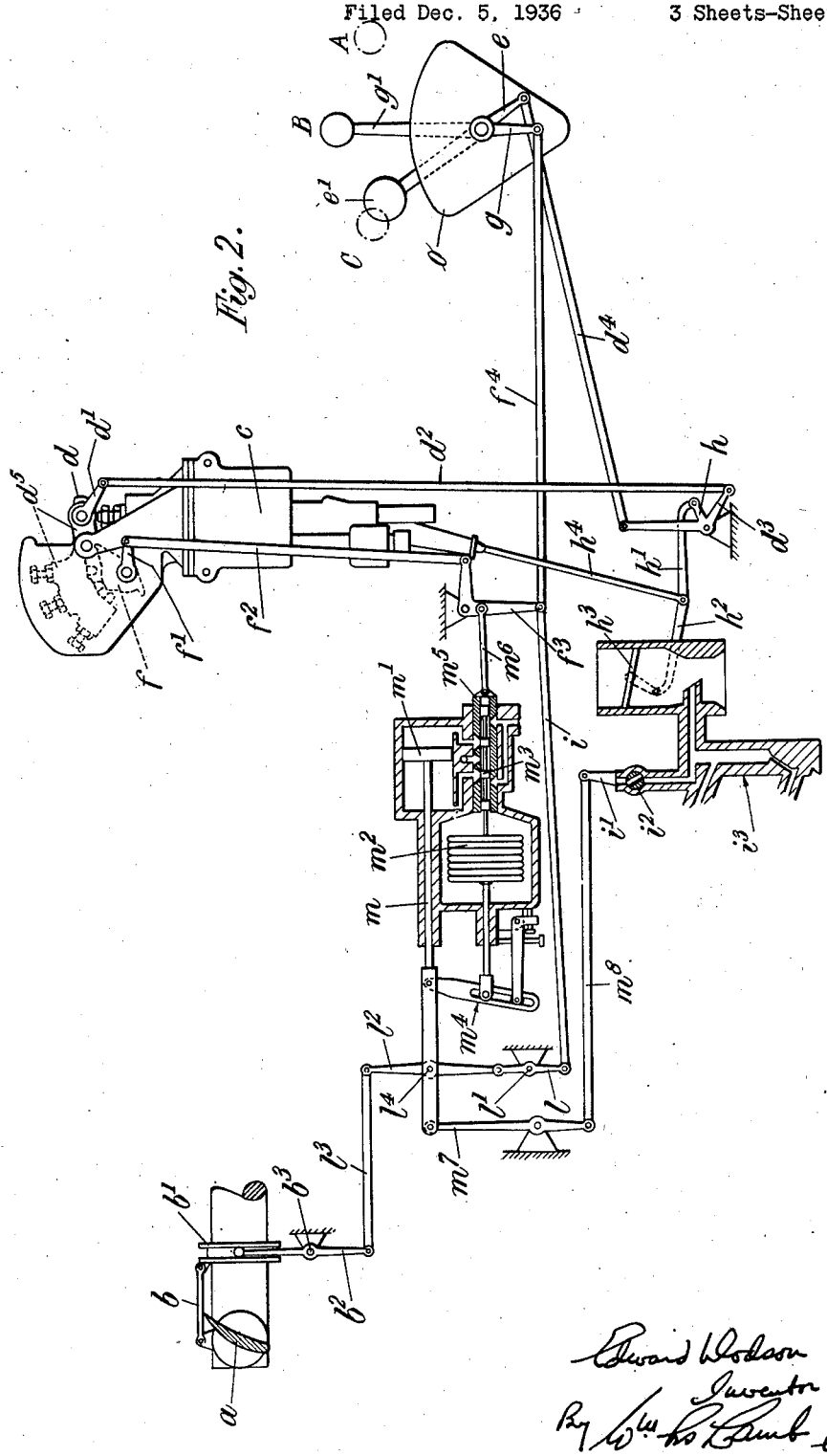
Figure 2 is a similar view to Figure 1 but shows also means for altering the pitch changing means in accordance with changes in air density, irrespective of the alteration effected by the pilot's throttle controlling means.

Figure 2 illustrates a similar controlling means for controlling the same pitch changing means as that described and illustrated in Figure 1 and like references are used to illustrate like parts in these views.

In the Figure 2 arrangement, however, the controlling means is supplemented by an aneroid control for changing the pitch of the propeller automatically with changes in air density, irrespective of the controlling means operable by the pilot's control throttle. The aneroid device used for the automatic control is shown as being that which is used for the purpose of changing the mixture strength automatically with change of altitude.

In this modified arrangement the link $i$, instead of connecting the bell-crank lever $f^3$ to the mixture control, connects it to a lever $l$ mounted on a fixed fulcrum $l^1$, which lever $l$ is connected to a floating lever $l^2$, the opposite end of which is pivotally connected to a link $l^3$ pivoted on the end of the arm $b^2$ of the pitch changing means. The lever $l^2$ is pivotally mounted intermediate its ends on a pivot attached to a piston rod $m$ of the servo motor piston $m^1$, which operates in a known way under the control of an aneroid $m^2$ actuating the valve $m^3$ for controlling the flow and return of pressure fluid to the servo motor piston $m^1$. The aneroid $m^2$ is provided with a follow-up gear $m^4$ for stopping the servo motor when the necessary adjustment has been effected. A separate sleeve valve $m^5$ is provided for varying the action of the aneroid and this valve is operatively connected by a link $m^6$ to the bell-crank lever $f^3$. With this arrangement the pitch changing means is operated from the mixture control lever through the links $f^4$, $i$, levers $l$, $l^2$ and link $l^3$ in the same way as in Figure 1 and in actuating the pitch controlling means in this way the lever $l^2$ is rocked about the pivot $l^4$ as a fulcrum. The pitch changing means is, however, also operable by the servo motor of the aneroid device $m^2$ which rocks the lever $l^2$ about its pivot on the lever $l^1$ as a fulcrum to impart adjustment to the pitch changing device through the link $l^3$.

The piston rod $m$ of the servo motor is also connected through a lever $m^7$ and link $m^8$ to the arm $i^1$ of the mixture control $i^2$ so as to act to vary the supplementary air entering the carburettor through the valve $i^2$ in accordance with changes in altitude and also in accordance with the setting of the mixture control $g^1$, and thus regulates the mixture strength. The operation of the Fig. 2 arrangement is the same as that of Fig. 1 except that the aneroid devices $m^2$ impose a further change in the pitch changing mechanism in accordance with change in altitude.

Figure 3:
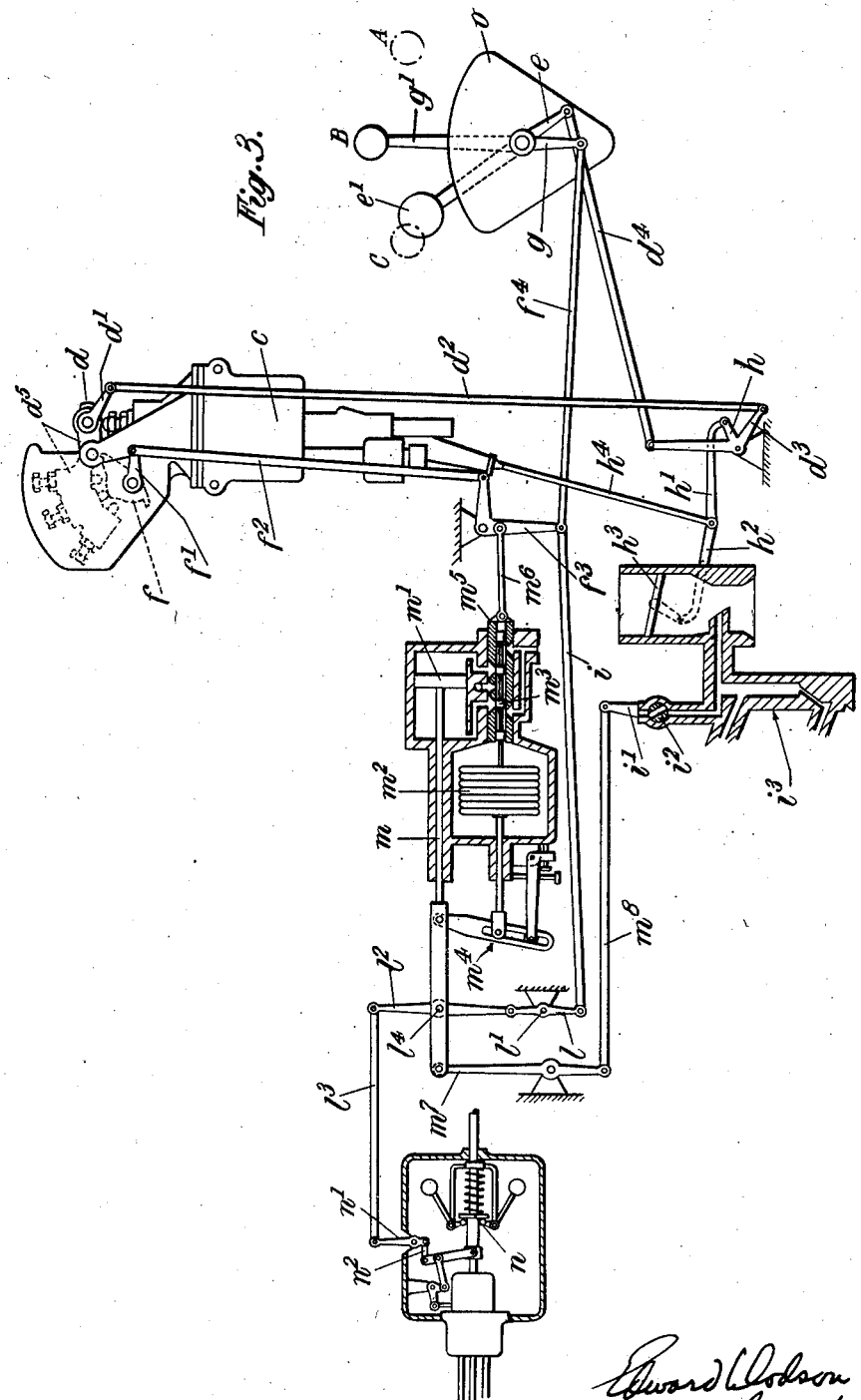
Figure 3 illustrates means for controlling pitch changing means of the type which acts to maintain the speed of the propeller constant, irrespective of the load and in which the control determines the speed at which the propeller is to be maintained constant.

Figure 3 shows controlling mechanism similar to Figure 2 in which like parts are indicated by like references. In this case, however, instead of the controlling mechanism being connected by the link $l^3$ to means for actually changing the pitch, said link is connected to known mechanism for controlling the governor, on mechanism for varying the pitch of the propeller of the well-known constant-speed type, in which said mechanism acts to adjust the pitch of the blades to maintain the speed of the propeller constant, irrespective of variations in engine load. The known governor mechanism is indicated at $n$ and said mechanism is provided with a lever $n^1$ connected to the mechanism by a link $n^2$ and connected at its opposite end to the link $l^3$, this lever serving to control the speed at which the propeller is to be maintained constant. In this construction the means operable by the pilot's throttle control will actuate said lever $n^1$ to vary the effect of the governor mechanism; and the aneroid control will also act to operate said lever $n^1$ independently of the throttle control means. Under actuation by either the pilot's throttle control operated means or the aneroid operated means, the effect of the governor will be varied to vary the pitch of the propeller blades in relation to the engine speed. The operation of the Fig. 3 arrangement is the same as that of Fig. 2.

The means for interconnecting the throttle control $e^1$ with the mixture control $g^1$ applicable to any one of the three constructions hereinbefore described, is shown in Figure 4. As shown in this figure the mixture lever is interconnected with the actuating lever $j$ by a projection on said lever (not shown) engaging in a slot $j^2$ on the mixture control $g^1$ and said actuating lever $j$ is formed with an extension $j^3$ which co-operates with one of two stops $e_2$, mounted on the throttle control so that, if the mixture control $g^1$ is in the weak mixture position shown in chain-dotted lines in Figure 4 and the throttle control lever is in the position shown in chain-dotted lines, then the movement of the throttle control $e^1$ from its chain-dotted position to its full line position will act to rock the actuating lever $j$ about its pivot $j^1$ and thus move the mixture lever from its chain-dotted position to its full line position. Similarly, if the throttle control is moved over to its extreme position at the right-hand side of the casing $o$, while the mixture lever is in the weak mixture position indicated in chain-dotted lines, then the stop $e^3$ will engage with the actuating lever $j$ and again rock this about its pivot $j^1$ to move the mixture control into the full line position.

What I claim as my invention and desire to secure by Letters Patent is:—

1. Means for controlling variable pitch propellers on supercharged aircraft engines, comprising in combination, a pilot's throttle control, a throttle valve, devices connecting said control to said valve, a boost control connected to said connecting devices arranged to vary the position of the throttle valve relative to that of said control according to altitude, means for changing the datum of said boost control, a mixture control, connecting mechanism for connecting said datum changing means to said mixture control, means operable by said throttle control for moving the mixture control as the throttle control approaches the full throttle position, means for changing the pitch of the propeller and means connecting said pitch changing means to said connecting mechanism between the mixture control and the datum changing means.

2. Means for controlling variable pitch propellers on supercharged aircraft engines, comprising in combination a pilot's throttle control, a throttle valve, devices connecting said control to said valve, a boost control connected to said connecting devices arranged to vary the position of the said throttle valve relative to that of the said throttle control according to altitude, means for changing the datum of said boost control, a mixture control, a mixture control valve, connecting mechanism for operably connecting said mixture control to the datum changing means and to the mixture control valve, means for preventing the said throttle control from being moved to a predetermined position while the mixture control is in a weak mixture position, means for changing the pitch of the propeller and means for connecting said pitch changing means to said connecting mechanism.

3. Means for controlling variable pitch propellers on supercharged aircraft engines, comprising in combination a pilot's throttle control, a throttle valve, devices connecting said control to said valve, a boost control connected to said connecting means arranged to vary the position of the said throttle valve relative to that of the said throttle control according to altitude, means for changing the datum of said boost control, a mixture control adapted to vary the strength of the mixture supplied to the engine, means operatively connecting said datum changing means to the mixture control, means for preventing the throttle control from being moved to a predetermined position while the mixture control is in a weak mixture position, means for changing the pitch of the propeller and means for connecting said pitch changing means to the means operatively connecting said datum changing means to the mixture control.

4. Means for controlling variable pitch propellers on supercharged aircraft engines, comprising in combination a pilot's throttle control, a throttle valve, devices connecting said throttle control to said valve, a boost control connected to said connecting devices arranged to vary the position of the said throttle valve relative to that of the said throttle control according to altitude, means for changing the datum of the boost control, a mixture control adapted to vary the strength of the mixture supplied to the engine, means for preventing the throttle control being moved into a predetermined position while the mixture control is in a weak mixture position, mechanism for connecting said mixture control to said means for changing the datum of the boost control, means for changing the pitch of the propeller, a pressure sensitive device and means for interconnecting said pitch changing means with said pressure sensitive device and with said mechanism in such a manner that the pitch changing means is operable by said pressure sensitive device, irrespective of its operation by the said mechanism.

5. Means for controlling variable pitch propellers on supercharged aircraft engines, comprising in combination, a pilot's throttle control, a throttle valve, means connecting said control to said valve, a boost control connected to said connecting means arranged to vary the position of the said throttle valve relative to that of the said throttle control according to altitude, means for varying the datum of said boost control, a mixture control valve, means operatively connecting said mixture control valve to a pressure sensitive device adapted to change the fuel/air ratio in accordance with changes in air density, a mixture control, means operatively connecting said mixture control both to said pressure-sensitive device for operating said mixture control valve independently of said pressure sensitive device, and also to said datum varying means, means for changing the pitch of the propeller and means interconnecting said throttle and mixture controls, means for connecting said pitch changing means both to the mixture control and to the said pressure sensitive device for independent operation by each.

6. Means for controlling variable pitch propellers on supercharged aircraft engines, comprising in combination, a pilot's throttle control, a throttle valve, means connecting said control to said valve, a boost control connected to said connecting means arranged to vary the position of the said throttle valve relative to that of the said throttle control according to altitude, means for changing the datum of the boost control, a mixture control adapted to vary the strength of the mixture supplied to the engine, means for preventing the throttle control being moved into a predetermined position while the mixture control is in a weak mixture position, mechanism for connecting said mixture control to said means for changing the datum of the boost control, means for changing the pitch of the propeller, a floating lever connected to said pitch changing means, means for connecting said mixture control to said floating lever at a point spaced apart from its connection to said pitch changing means, a pressure sensitive device, means connecting said pressure sensitive device to the floating lever at a point spaced apart from its connections to both the pitch changing means and the mixture control whereby the said device is adapted to operate said pitch changing means in accordance with changes in air density, irrespective of the operation effected by the said mixture control.

EDWARD DODSON.